Feb. 4, 1958     J. LORENZ     2,821,816
KNIFE SHARPENER
Filed June 1, 1956     2 Sheets-Sheet 2
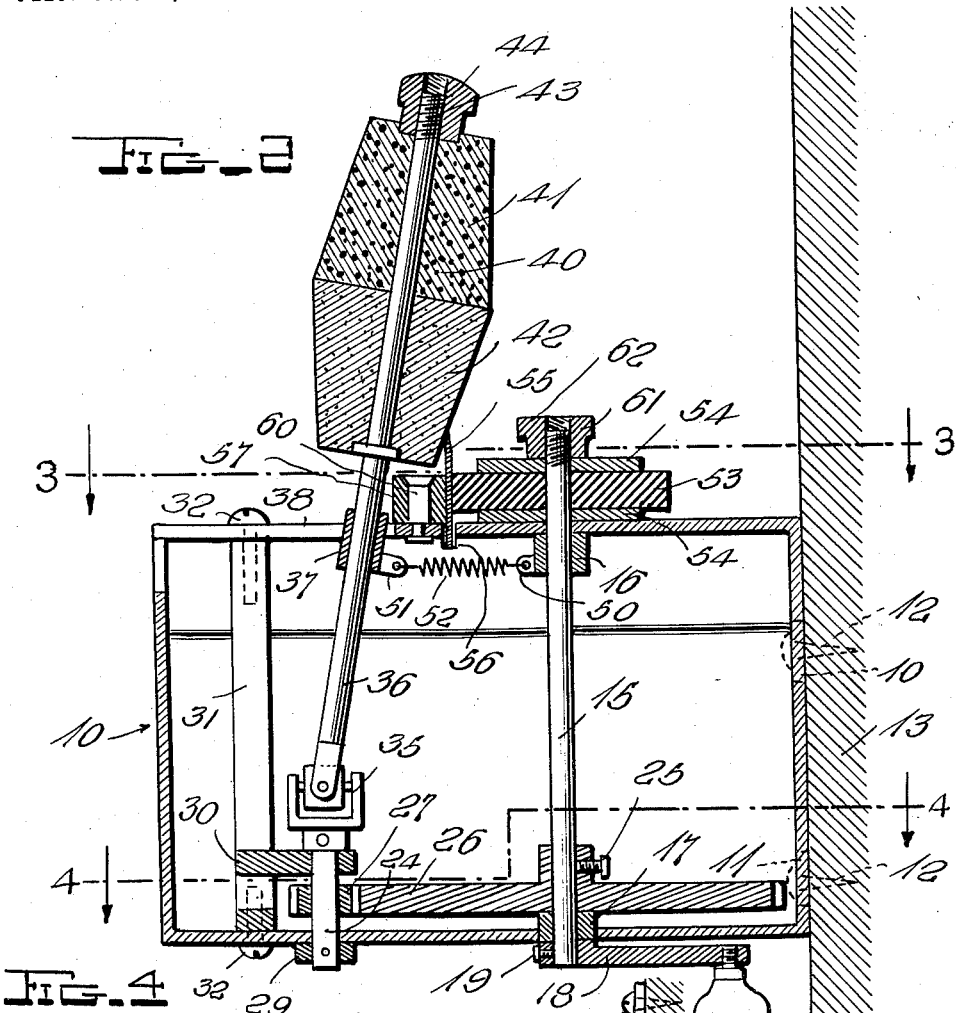
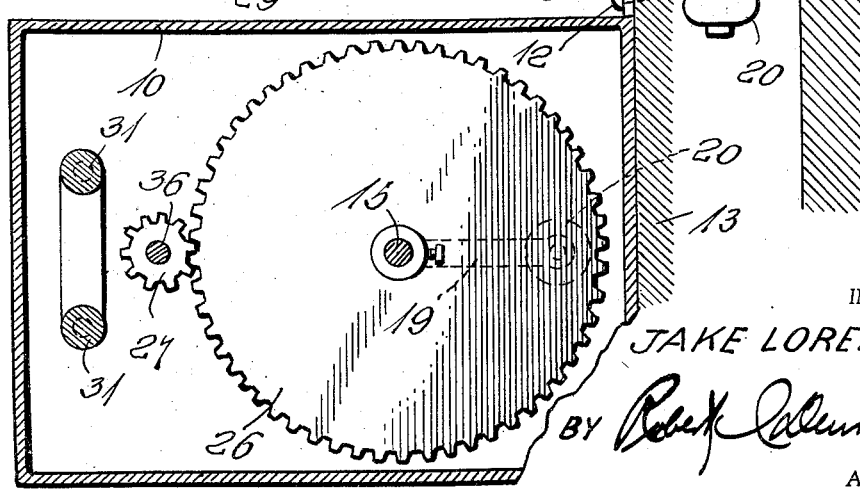
INVENTOR
JAKE LORENZ,
BY
ATTORNEY United States Patent Office 2,821,816
Patented Feb. 4, 1958

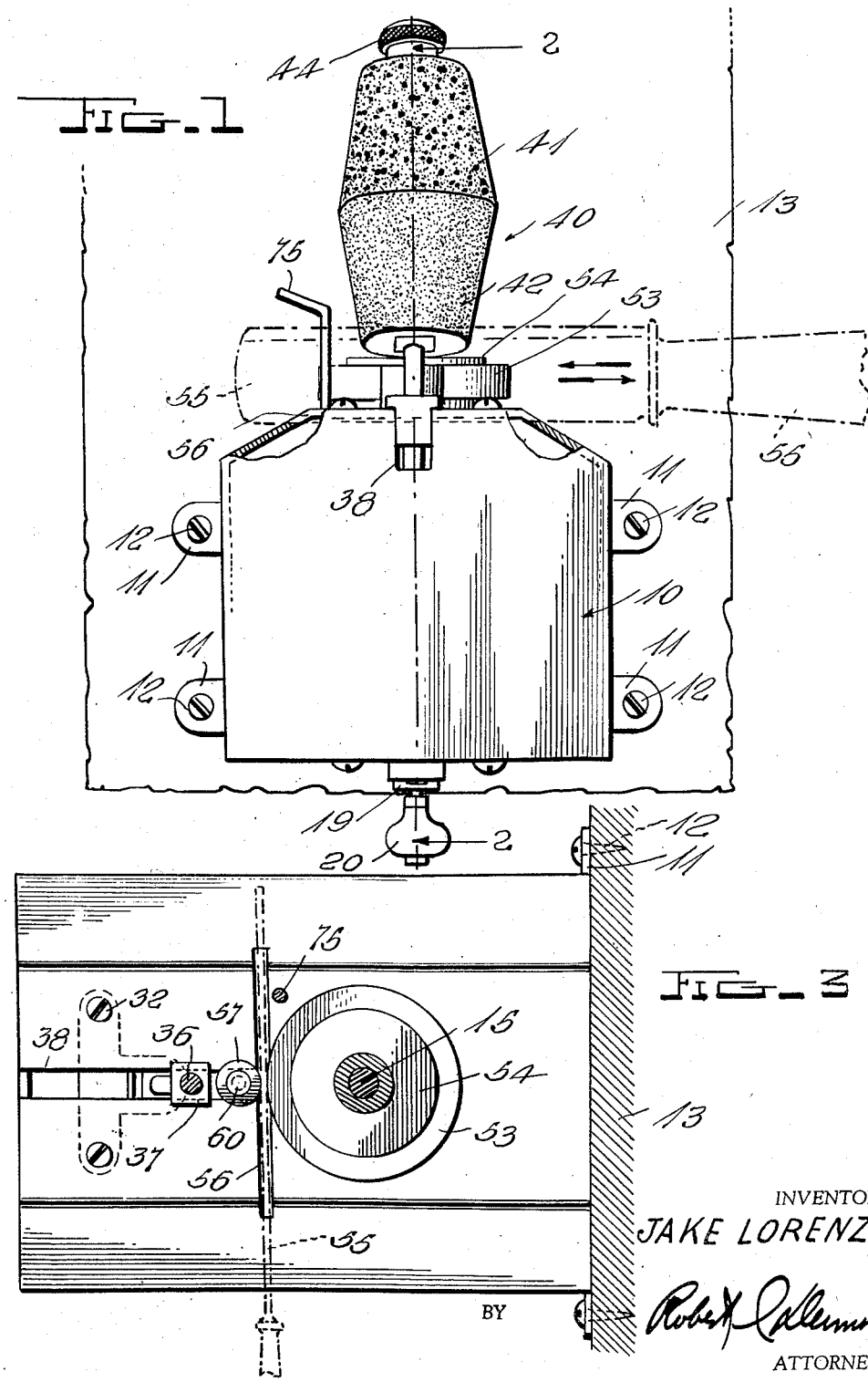

2,821,816

KNIFE SHARPENER

Jake Lorenz, Altario, Alberta, Canada

Application June 1, 1956, Serial No. 588,874

2 Claims. (Cl. 51—78)

This invention relates to a knife sharpener, and has as its primary object the provision of a knife sharpener which requires little or no skill in its operation.

A further object of this invention is the provision of such a sharpener wherein means are provided for maintaining constant emery stone pressure on the knife edge automatically, the pressure being equal throughout the full length of the knife edge.

Still another object of the invention is the provision of a single whetstone having a medium emery surface and a fine emery surface, the stone being secured in position as by means of a thumb nut so as to be readily reversible to juxtapose either surface selectively to be sharpened.

A further object of the invention is the provision of an attachment for the device whereby the same may be adapted to the sharpening of scissors.

Still another object of the invention is the provision of a pressure roller adapted to be manually rotated for the passing of a knife edge for its full length adjacent the emery stone.

Still other objects reside in the combinations of elements, features of construction and arrangements of parts, all as will be more fully pointed out hereinafter and shown in the accompanying drawings wherein there is disclosed a preferred embodiment of this inventive concept.

In the drawings:

Fig. 1 is a front elevational view of one form of device embodying the instant invention.

Fig. 2 is a sectional view taken substantially along the line 2—2 of Fig. 1.

Fig. 3 is a sectional view taken substantially along the line 3—3 of Fig. 2 as viewed in the direction indicated by the arrows, and Fig. 4 is a sectional view taken substantially along the line 4—4 of Fig. 2 as viewed in the direction indicated by the arrows.

Similar reference characters refer to similar parts throughout the several views of the drawings.

Having reference now to the drawings in detail, there is generally indicated at 10 a casing or housing, provided with a plurality of lugs 11 apertured to receive screws 12, the screws 12 being adapted to secure the device to a vertical wall 13 or the like.

Within casing 10, as best shown in Fig. 2, there is positioned a shaft 15, journaled in suitable upper and lower bushings 16 and 17 respectively, the upper and lower ends of shaft 15 extending through suitable aligned apertures in the upper and lower walls of the casing 10. The lower projecting end of shaft 15 carries a crank 18 held in position by means of a set screw 19 and provided with a handle 20. Adjacent the lower portion of shaft 15 and secured thereto by means of set screw 25 is a relatively large gear wheel 26 which is adapted to mesh with a reduction gear 27 carried on a rotatable stub shaft 24 mounted in a lower bushing 29, and an upper bushing 30, the upper bushing being carried by a support 31 secured as by screws 32 to the upper and lower walls of casing 10.

The upper end of shaft 24 carries a universal mounting 35 from which extends an angularly inclined shaft 36, supported by a bushing 37 which is linearly movable in a slot 38. The upper end of shaft 36 carries a one-piece emery stone 40, comprised of a medium section 41 and a fine section 42, both sections being frusto-conical and in base-opposed relation.

The upper end of the shaft 36 is threaded as at 43 and carries a manually rotatable nut 44 which is removable whereby the position of the emery stone may be readily reversed.

The bushing 16 carries a lug 50, while the bushing 37 carries a lug 51 between which lugs extend a tension spring 52 serving normally to bias the shaft 36 toward a rubber feed wheel 53 mounted between suitable washers 54 exteriorly of the casing 10 which is adapted to engage the blade of a knife 55 adapted to seat in a suitable transverse slot 56 in the top of casing 10. On the opposite side of slot 56 is an idler bushing 57 mounted on a stub shaft 60 seated in the top wall of housing 10.

The upper end of shaft 15 is threaded as indicated at 61 and accommodates a nut 62, by means of which of which the rubber feed wheel 53 may be readily replaced.

A knife 55 to be sharpened is inserted in slot 56, its blade or sharper edge being upward. Having a firm grip on the knife handle, the knife is forced between roller 57 and rubber power wheel 53. The pressure caused by the knife as it is pushed the full length of blade will cause friction on rubber wheel 53 causing rotation of shaft 15, and simultaneously, through gears 26 and 27, the shaft 36, and hence emery stone 40, which will be rotated at much higher rate of speed, thus sharpening one edge of the knife. By pushing and pulling the blade the full length a few fast strokes one side of the blade will be honed. After one side is honed, the knife may be inserted on the opposite side and the operation repeated to hone the other side of the blade.

As best seen in Fig. 1 an obtusely angled support 75 is carried by the top of casing 10 to serve as a support for a tool blade such as a chisel, screw driver, or the like, at the proper angle for honing the same by means of the emery stone 40.

The roller 53 and the stone 40 are rotated by means of crank 19 only for the sharpening of small tools such as jackknives, screw drivers, chisels, scissors or the like.

In the case of scissors the longitudinal movement of the blade is effected manually.

From the foregoing it will now be seen that there is herein provided a knife sharpener which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a knife sharpener a pressure feed roll, an inclined grinder wheel, means for simultaneously rotating said pressure feed roll and said grinder wheel, separate shafts driving said grinder wheel and said roll, one of said shafts being universally mounted, and means mechanically governing the pressure of the grinder wheel on a knife passed between said wheel and said roll, said means comprising a slidable bushing carried by one of said shafts, and a fixed bushing carried by the other, and spring means connecting said bushings to bias said universally mounted shaft toward the other of said shafts.

2. In a knife sharpener a casing, an idler roller mounted free to rotate on the casing, a power wheel, a shaft mounted rotatable in the casing and on which the power wheel is carried, said roller and power wheel being adapted to have a knife movable lengthwise therebetween frictionally engaged by the power wheel, a further shaft rotatable in the casing universally mounted, means connecting the universally mounted shaft to be driven by the power wheel shaft, a grinder wheel on the universally mounted shaft, spring means drawing the grinder wheel into grinding relation with a knife carried between the idler roller and power wheel and including means limiting such movement of the grinder wheel, and manually operable means by which the power wheel shaft may be rotated.

References Cited in the file of this patent

UNITED STATES PATENTS

| | | |
|---|---|---|
| 270,964 | McDonald | Jan. 23, 1883 |
| 2,087,238 | Brostrom | July 20, 1937 |
| 2,203,788 | Jenks | June 11, 1940 |
| 2,211,014 | Ivancin | Aug. 13, 1940 |